United States Patent [19]

Lesster et al.

[11] 3,989,951

[45] Nov. 2, 1976

[54] WAVE ENERGY POWER GENERATING BREAKWATER

[75] Inventors: Laban E. Lesster; Robert Etkins, both of Crofton, Md.

[73] Assignee: Westinghouse Electric Corporation, Pittsburgh, Pa.

[22] Filed: Apr. 29, 1975

[21] Appl. No.: 572,816

[52] U.S. Cl................................ 290/53; 417/330; 92/90
[51] Int. Cl.². .................... F03B 13/10; F03B 13/12
[58] Field of Search ................ 290/1, 53; 417/330, 417/240, 241; 60/495, 496; 92/89, 90

[56] References Cited
UNITED STATES PATENTS

| | | | |
|---|---|---|---|
| 3,353,787 | 11/1967 | Semo | 417/330 |
| 3,598,505 | 8/1969 | Greene et al. | 417/330 |

FOREIGN PATENTS OR APPLICATIONS

| | | | |
|---|---|---|---|
| 520,968 | 1/1956 | Canada | 417/330 |
| 1,336,832 | 7/1962 | France | 417/330 |

Primary Examiner—James R. Scott
Assistant Examiner—John W. Redmon
Attorney, Agent, or Firm—D. F. Straitiff

[57] ABSTRACT

A breakwater apparatus for generating electrical power by extracting energy from sea waves. A novel array of subsurface fixed-position flexible-walled pneumatic bags or cells, in a closed cycle system, react to surface-wave-correlated static pressure variations by expiring compressed gas into a supply header to a generator-driving pneumatic motor while simultaneously inspiring return gas in a return header from such motor. Alternate inspirational-expirational operation of individual cells involves use of a supply check valve at each cell, discharging into the supply header, and a return check valve at each cell, receiving from the return header.

4 Claims, 6 Drawing Figures

WAVE ENERGY POWER GENERATING BREAKWATER

BACKGROUND OF THE INVENTION

1. Field of the Invention

Apparatus for generating electrical power by extracting energy from ocean waves.

2. Description of the Prior Art

A preponderant number of prior art concepts aimed at producing useful electrical power from the vertical motion of ocean waves, of which applicants are aware, have involved the use of floats, either to produce a mechanical generator-operating action through gearing or the like, as in Masuda U.S. Pat. No. 3,204,110, for example, or to compress atmospheric air entrapped above the wave crests to operate an air motor driving the electric generator, as in Corbett Jr. et al U.S. Pat No. 3,064,137, for example.

One apparatus, however, as disclosed in a Semo U.S. Pat. No. 3,353,787 is based on a closed hydraulic system employing an array of submerged fixed-position tubes extending parallel to a shoreline and having flexible upper surfaces for downward deflection by overhead wave pressure to displace hydraulic fluid into a collecting conduit leading to a shore installation that includes an accumulator, a hydraulic motor for generator operation, and a return sump at exit to the motor. Return flow of hydraulic fluid to the submerged tubes is intended to occur via the above collecting conduit. A check valve at each tube permits facile egress of fluid from such tube and a restricted port through each check valve is intended to permit slow return flow to each tube for refilling.

While a submerged closed-circuit power generating system of the fixed-position flexible-wall fluid-displacing type can have the advantage of allowing the ocean surface to remain unobstructed while at the same time affording a breakwater action for shoreline protection, the practical operability of the Semo apparatus is questionable with respect to displacement of hydraulic fluid by wave-created subsurface pressure variation, as well as with respect to the facile-egress restricted-return flow to and from the tubes imposed by the choked check valves in such Semo system.

SUMMARY OF THE INVENTION

The submerged closed-circuit system of the present invention, in employing a compressible gas, such as air, rather than a hydraulic fluid as in the Semo system discussed above, provides a working fluid medium of sufficiently low mass as to afford significant displaceability by the static pressure differences created in the environment of applicant's pneumatic cells by the overhead surface waves; which displaceability may be relatively insignificant in the case of hydraulic fluid. At the same time, applicant's use of separate supply and return headers extending to and from the pneumatic motor and connected to the pneumatic flexible-wall cells via respective check valves provides a push-pull action on such motor that also assures reinflation of deflated cells by return air from the motor at the same time and rate as other cells are expelling air to the motor inlet; in contrast to the Semo arrangement where return flow of working fluid to the tubular members is restricted. An additional feature of applicant's system resides in the use of shortlength cells, rather than the elongated tubes as in Semo. This affords a higher degree of flexibility with respect to the different modes of operation available for applicant's arrangement in contrast to that of Semo's.

DESCRIPTION OF THE PREFERRED EMBODIMENTS

Figure 1:
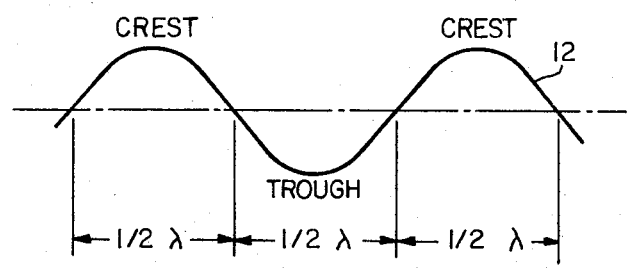
FIG. 1 is a simplistic representation of an ocean wave in elevation.
Figure 2:
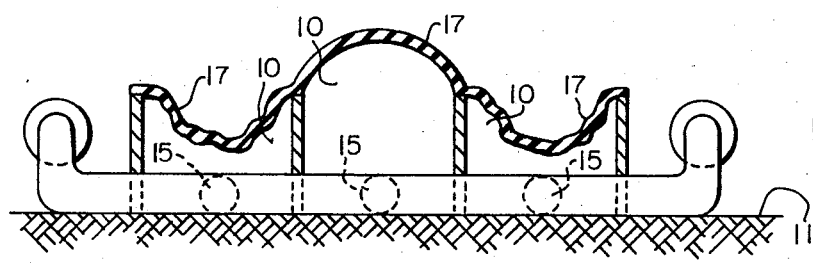
FIG. 2 is a vertical cross section view of a schematic representation of a three-cell array of pneumatic cells shown in correlation with the wave of FIG. 1 for powering an air-driven turbo-generator means while acting as a breakwater for such wave.
Figure 3:
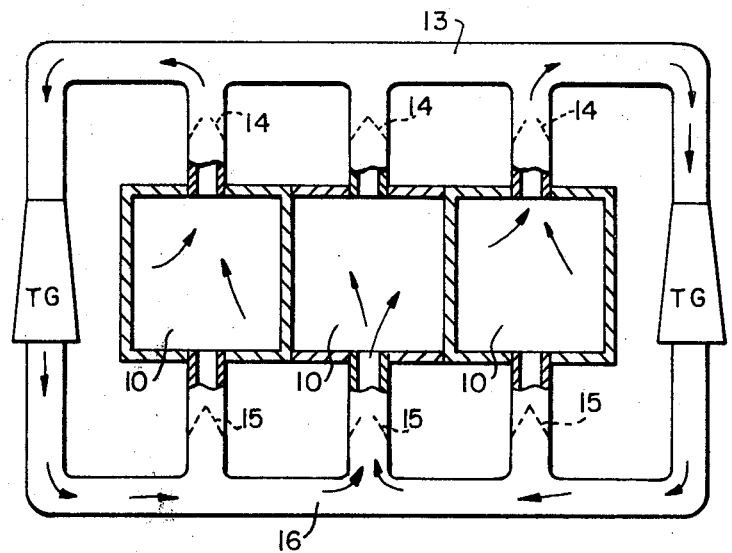
FIG. 3 is a cross-sectional plan view of the subsurface pneumatic cell array of FIG. 2, depicting in particular the pneumatic circuit employed for operation of the turbo-generator means.
Figure 6:
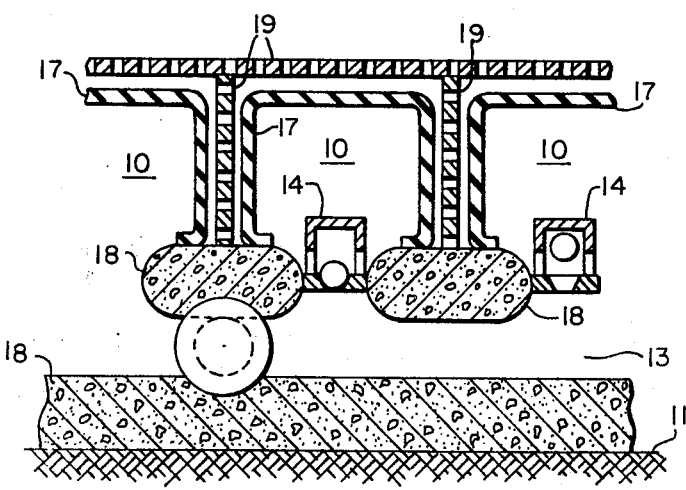

Referring to FIGS. 1, 2 and 3 in the drawing, the novel power-generating breakwater of the present invention comprises a series of contractible-expandible pneumatic cells 10 anchored to and resting on the bottom 11 of an ocean or other large body of water near a shoreline (not shown), for example, and disposed beneath surface waves 12 travelling inwardly toward such shoreline. All of the cells of the row 10 empty into a common turbine supply line 13 via supply check valves 14 and are adapted to receiver return air via respective return check valves 15 and a common return line 16. The supply line 13 is connected to the inlet of one or more turbines of turbo-generators TG. Discharge from such turbines releases into the return line 16. By way of example the contractibility-expandibility characteristic of the cells 10 may be afforded by use of flexible upper walls 17 of suitably reinforced resilient material such as rubber, and the side, end, and bottom walls of the cells may be rigid. In FIG. 6, the bottom walls are constructed of concrete 18, together with the supply and return lines 13 and 16, and the vertical and top walls of the cells are flexible. A rigid metal grillwork 19 extends over the flexible top walls and between the flexible vertical cells to define the outer dimensions of such cells while protecting same from objects that might otherwise come in contact with such relatively fragile members.

In operation, assuming that the cells 10 are arranged in series along the path of travel of the wave motion, as is true in the showing in FIGS. 2 and 3 with respect to the wave 12 in FIG. 1, and further that the length of each cell in such wave motion travel direction is less than a full wavelength long and preferably equal to or less than one-half wavelength long, then as the surface wave motion moves above the subsurface cells 10, those cells beneath the wave crests will experience higher pressures than those beneath the wave troughs. This pressure difference between the two sets of cells results in contraction of the sub-crest cells 10 and expansion of the sub-trough cells; as permitted by the flexible upper walls thereof, for example. Such contraction of the sub-crest cells results in expiration of air from such cells into the common supply line 13 to the turbines affiliated with the turbo-generators TG, via the check valves 14, at the same time that air is inspired to flow from the turbine exhausts via the return line and check valves 15 into the expanding cells. This arrangement creates a push-pull action with respect to operation of the turbines and assures that any air flow from the cells 10 that may transpire will occur only by way of the turbines to create a useful power output. The half-wavelength-long cells 10 of FIGS. 2 and 3 tends to produce fluctuation in the pressure differential established between the supply and return lines 13 and 16 across the turbines, which may or may not be significant to their successful operation.

Figure 4:
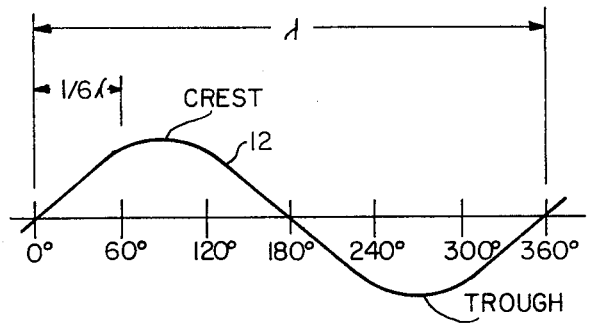
FIG. 4 is another simplistic representation of an ocean wave in elevation.
Figure 5:
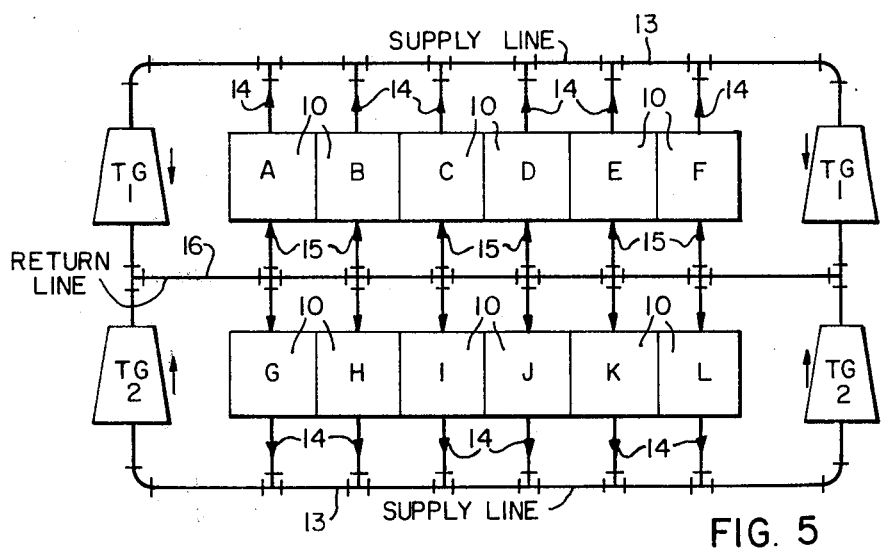
FIG. 5 is a plan view of a schematic representation of an alternate array of subsurface pneumatic cells and pneumatic circuit shown in correlation with the wave of FIG. 4 and in dual arrangement that affords flexibility in mode of operation of the system; and, FIG. 6 is a vertical section view of an exemplified construction for the pneumatic cells.

To provide a smoother pressure differential generation, an arrangement such as shown in FIG. 5 relative to the wave 12 above it, may be employed. In this arrangement the length of each cell 10 is made to be one third of a halfwavelength long, or one sixth wavelength long, to obtain a three-phase action with respect to pressure differential generation. With reference to FIG. 4, assume the wave 12 to be travelling from left to right with respect to the series of pneumatic cells 10 identified by capital letters A to F. With respect to the forward end of cell A; at the 0° part of wave 12 air will be flowing from cells A, B, and C to cells D, E, and F; at 60°, from ABF to CDE; at 120°, from AEF to BCD; at 180°, from DEF to ABC; at 240°, from CDE to ABF; at 300°, from BCD to AEF; and at 360°, again from ABC to DEF. Here again, the arrangement of the cell series in FIG. 5 is similar to the series in FIG. 2, in that all cells 10 empty into a common supply line 13 via respective check valves 14, and into a common return line 16 via respective check valves 15.

If it should be desired that a series array of cells 10 be able to function when the wave travel direction is transverse to the array length, i.e. when all cells are exposed to the same phase of the wave simultaneously, then a dual series of cells such as also shown in FIG. 4 may be employed, with the two sets of cells sharing the same return line. With this arrangement, assuming that the two cell sets A to F and G to L are one half wavelength apart, then air will be caused to flow alternately from one cell set to the other and to cause alternate operation of one pair of turbine generators TG 1 and then the other pair of generators TG 2.

While it is apparent that the system of the present invention can function to generate electrical power from the action of ocean waves travelling above, it is believed to be feasible to employ such a system when it can be done to the extent that the air cell arrays act also to provide a breakwater that otherwise would be provided in another or submerged pneumatic bag form as advanced in a publication titled Offshore Terminal Systems Concepts, Part 3, by the Soros Association, Inc. in 1972.

We claim:

1. Apparatus utilizing energy of waves from a body of water comprising:
    a plurality of stationary contractible-expandible submerged pneumatic cells disposed beneath the surface of such body of water,
    supply conduit means,
    return conduit means,
    compressible fluid motor means having an inlet and an outlet open to said supply and return conduit means, respectively,
    a first plurality of one-way-flow means communicating said supply conduct means with said pneumatic cells, respectively, and
    a second plurality of one-way-flow means communicating said return conduit means with said pneumatic cells, respectively.

2. The apparatus of claim 1, wherein said supply conduit means, return conduit means, and fluid motor means are also disposed beneath the surface of said body of water.

3. The apparatus of claim 1, wherein said motor means is operatively associated with electric generator means.

4. The apparatus of claim 1, wherein the dimension of each of said cells in the direction of wave travel is less than one-half the wavelength of the more usual ones of the aforesaid waves.

* * * * *